April 10, 1945.　　　T. W. KENYON　　　2,373,120
ERECTION DEVICE FOR GYRO VERTICALS
Filed June 19, 1941　　　2 Sheets-Sheet 1

INVENTOR
THEODORE W. KENYON
BY
Herbert H. Thompson
HIS ATTORNEY

April 10, 1945.    T. W. KENYON    2,373,120
ERECTION DEVICE FOR GYRO VERTICALS
Filed June 19, 1941    2 Sheets-Sheet 2

INVENTOR
THEODORE W. KENYON
BY
HIS ATTORNEY

Patented Apr. 10, 1945

2,373,120

UNITED STATES PATENT OFFICE 2,373,120

ERECTION DEVICE FOR GYRO VERTICALS

Theodore W. Kenyon, Huntington, N. Y., assignor to Sperry Gyroscope Company, Inc., Brooklyn, N. Y., a corporation of New York Application June 19, 1941, Serial No. 398,693

13 Claims. (Cl. 74—5)

This invention relates to gyro-verticals or gyroscopic artificial horizons especially adapted for use as attitude indicators on aircraft. It will be obvious, however, that the broad principles of the invention have application to other types of gyroscopic apparatus. As now constructed, such attitude indicators usually comprise a gyroscope mounted in neutral equilibrium and maintained vertical by gravitationally controlled erecting forces such, for instance, as shown in the patent to Bert G. Carlson, No. 1,982,636, dated December 4, 1936, for Air driven gyro-verticals.

One object of the present invention is to improve the accuracy of such devices by providing a means for increasing the erecting force for small tilts of the gyroscope, thereby maintaining the vertical position of the gyroscope within closer limits than heretofore possible in this type of instrument.

Another object of the invention is to simplify the gravitational controller for such devices.

A further object of the invention is to provide a means to lessen the deviation of the gyroscope from the true vertical during turns or other acceleration of the craft.

Referring to the drawings, showing several forms my invention may assume,

Figure 1:
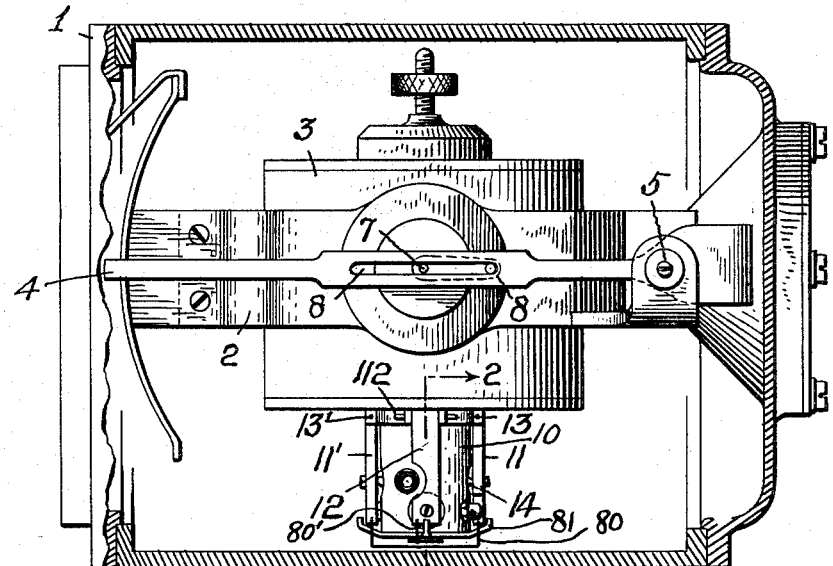
Fig. 1 is a side elevation of a gyroscopic artificial horizon, the outer casing being shown in section.

I have shown my invention as applied to a standard form of gyroscopic artificial horizon in which the rotor is usually air spun. The instrument is shown as enclosed in an outer housing 1 in which is journaled a gimbal ring 2 on a fore and aft axis, the rotor bearing casing 3 being pivoted within the gimbal ring on a transverse axis 7. The indicator is shown in the form of the usual horizon bar 4 which is stabilized against rolling by being mounted on the gimbal ring 2 and is caused to pitch oppositely to the craft by being pivoted at 5 on the rear of the gimbal ring, and connected to the gyro case by a crank arm 6 secured to the horizontal trunnion 7 of the gyro casing and having a pin 8 thereon engaging the horizontal slot 9 in the bar 4. The casing is usually mounted in neutral equilibrium and means are provided thereon for erecting the same by applying forces thereon at right angles to the tilt.

According to my invention, the case is provided with a downward hollow extension 10 through which the air within the casing escapes, which has a superior pressure to the air outside the casing. This difference in pressure may arise from the jets used to spin the rotor or, in case the rotor is electrically driven, it may be created by the spinning rotor. In either case I may provide, as in above referred to Carlson patent, a plurality of pendulous shutters 11, 11' and 12, 12' for controlling the erection forces, but I prefer to interpose between such shutters and the actual erection air jets which erect the gyroscope a multiplying self-energizing relay device by which I am able to greatly increase the erecting torque for small tilts. According to Fig. 2, I have shown the pair of pendulous shutters 11, 11' pivoted on spaced axes 13, 13' to swing in the plane of the paper. Normally said pendulums almost touch very small, apertures or "bleeds" 14, 14' in the ends of the transverse bore or cylinder 15, in which is placed a loosely fitting double piston valve 16. The pistons of said valve are made somewhat smaller than the bore so that some of the air under pressure coming down through the chamber 17 escapes beyond each piston and out the bleeder holes 14, 14'. The ends of each piston may have a ring 50 thereon of self-lubricating material. Most of the air, however, escapes out of laterally and oppositely directed ports 18, 18' and thence out jet pipes 19 and 19'. Such ports are normally half open, so that equal and opposite torques are exerted about a horizontal axis at right angles to the axes 13, 13'. Upon relative tilt of the gyro and pendulums, however, one bleeder 14 or 14' is closed more than the other, thereby building up a superior pressure behind the former, thus pushing the double piston 16 toward the low pressure side, thereby creating an unbalanced air reaction from the jet pipes 19 and 19'. It has been found experimentally that a much greater air reaction may be created with small tilts by this means than is possible where direct control of the air jets by the pendulous shutters is attempted. The air reaction from the bleed holes 14, 14' is so small as to be negligible and the shift of the light piston valve does not materially disturb the balance of the gyro. For accurate clearances, set screws 53 may be provided in each pendulum adjacent each bleed port or nozzle. Preferably, also the pendulums of each pair are tied together as by wire 80, 80' to unify their movements. A stop bracket 81 may also be provided to reduce and limit the swings of the pendulums.

Figure 3:
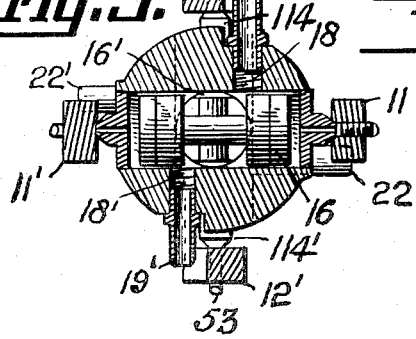
Fig. 3 is a transverse section of the same taken on line 3—3 of Fig. 2.

As shown in Fig. 3, the same construction is employed in connection with the other pair of pendulums 12 and 12' pivoted on spaced pins 112 which cooperate with bleed nozzles 114 and 114' to control a similar double piston valve 16' shown as positioned below the valve 16 and within a cylinder or bore extending at right angles thereto. Valve 16' similarly controls jet pipes 22 and 22' through ports (not shown). By this means the gyroscope is maintained vertical about all axes.

By my invention I have also rendered it possible to reduce the deviation of the gyroscope during turns. By making the bleeds 14 and 14' for the pendulums affected in turning very small, the resulting displacement of the piston valve 16 may be delayed so that the valve is only displaced for continuing tilt and not during turns of short duration.

Figure 6:
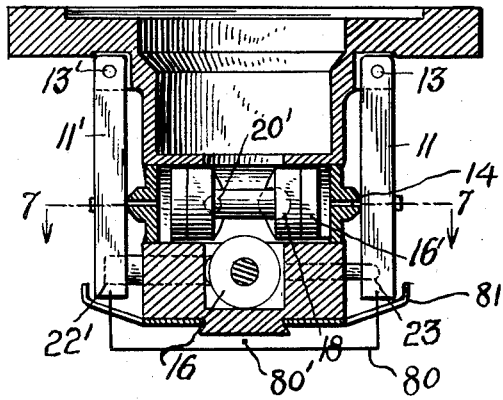
Fig. 6 is a section similar to Fig. 2, showing a slight modification of the form of the invention shown in Fig. 2.
Figure 7:
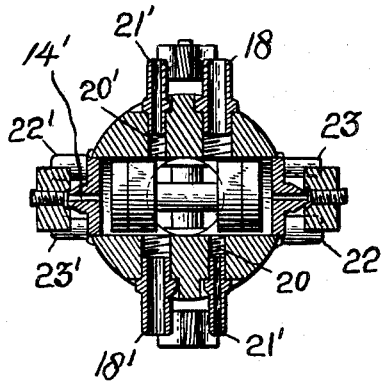
Fig. 7 is a transverse section taken on line 7—7 of Fig. 6.

A slight modification of this construction is shown in Figs. 6 and 7. According to these figures, in addition to the large ports 18, 18' there is employed a pair of smaller, oppositely directed ports 20, 20' with jet pipes 21 and 21'. These ports are for the purpose of assisting in the uniform discharge of air from the gyroscope and it will be seen in Fig. 6 that as port 18 is closed, port 20' will be further opened. However, due to the difference in size of the two ports, the same action is secured as in Figs. 2 and 3. It will be understood that the same construction is employed in connection with both pairs of pendulums, the jet pipes for the latter being shown at 22, 22' and 23, 23' in Fig. 7.

Figures 2, 4:
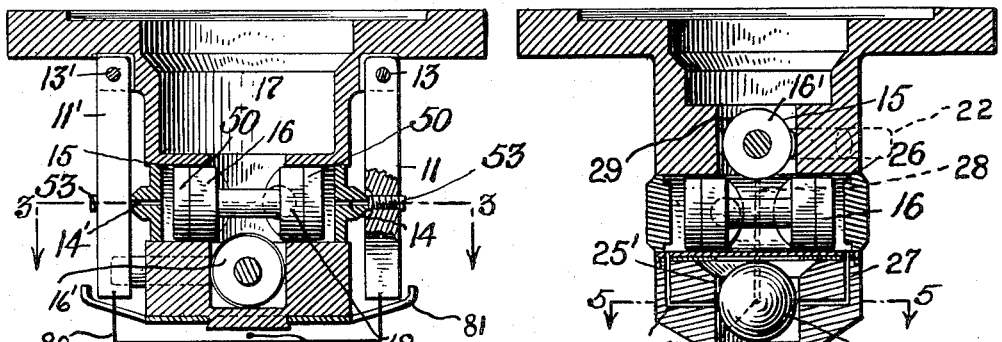
Fig. 2 is a vertical section through the lower extension of the gyro casing taken on line 2—2 of Fig. 1.
Fig. 4 is a section similar to Fig. 2, showing a modified form of gravitational controller.
Figure 5:
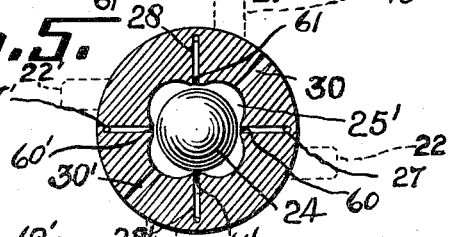
Fig. 5 is a transverse section taken on line 5—5 of Fig. 4.

A somewhat different form of the invention is shown in Figs. 4 and 5. In this form, the pendulous shutters are replaced by a single ball 24 resting on the bottom 25 of a downward extending chamber 25', the sides of which are close to but do not touch the ball. The bleed discharge ports from the two ends of the transverse cylinder 26 in this case are connected through narrow bore channels 27 and 27' to oppositely directed, bleed or discharge ports 60 and 60' positioned in a horizontal line with the center of the ball. The air escaping from said ports therefore will tend to centralize the ball as long as the gyroscope is vertical. Similar bleed lines 28 and 28' and ports 61 and 61' are connected to the opposite ends of the upper cylindrical chamber 29. The air discharged from the several bleed ports may pass out of the chamber through the larger channels 30, 30' at low velocity. It will readily be seen, therefore, that the ball controls the bleed ports in substantially the same manner as the pendulous shutters, resulting in displacement of the pistons 16 and 16' in the same manner as in the first described form of the invention.

An analysis of the movements of the pistons in the forms of the invention described in connection with Figs. 1, 2, 3, 6 and 7 will show that they move toward the low side of the gyroscope and therefore their movement is assisted by gravity. Similarly, in the presence of lateral acceleration forces due to turning, the movement of the pistons will be in the direction of the centrifugal force.

In the form shown in Figs. 4 and 5, however, analysis will show that the piston 16 will move in the opposite direction to tilt or, in other words, as the ball rolls to the low side, the piston will be forced to the high side. This has two advantages: (1) Since the ball and piston move in opposite direction, the balance of the gyroscope as a whole is less disturbed than in the other forms of the invention. (2) In this form of the invention, deviation of the gyroscope due to turns may be greatly lessened if the air pressures are properly correlated with the mass of the piston. Thus, assuming in Fig. 4 that centrifugal force is acting on both piston 16 and ball 24 to move them to the right, the result will be that pressure is built up on the right hand side of the piston 16, tending to force it to the left, i. e., against the centrifugal force. It is obvious that the device may be so designed that for the normal or procedure turns, the air pressure will balance the centrifugal force for a predetermined air speed so that no movement of the piston takes place and hence a large part of the turn errors will be avoided.

Figure 8:
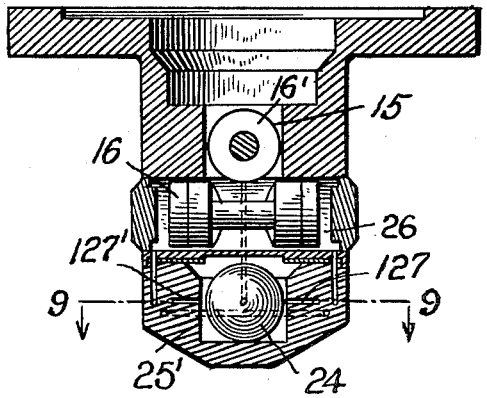
Fig. 8 is a sectional view similar to Fig. 4, showing a slight modification.
Figure 9:
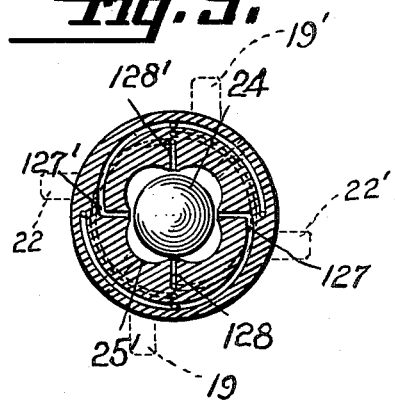
Fig. 9 is a section taken on line 9—9 of Fig. 8.

Figs. 8 and 9 show a form of the invention using a roller or ball type of gravitational control, as in Figs. 4 and 5, but one in which the piston is forced toward the low side of the gyroscope, as in Figs. 1, 2, 3, 6 and 7. To accomplish this, I have shown the bleed channels 127 and 127' as connected to opposite ends of the transverse cylinder 26 shown in Fig. 4, so that the air pressure will tend to force the piston 16' in the opposite direction to that in which the ball moves. Similar reversal of connections is shown in connection with the corresponding bleed channels 128 and 128'. The main discharge ports and jets 19, 19' and 22, 22' are also oppositely placed to those in Figs. 4 and 5 to keep the erecting forces in the proper direction.

The construction shown in these figures is preferable to that shown in Figs. 4 and 5, where great sensitivity is desired, since in this form gravity assists the differential air pressure in moving pistons 16, 16'.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In an air erector for gyroscopes, a universally mounted rotor casing, a cylinder and a piston member on said casing, a pair of ports in said cylinder adapted to be differentially opened and closed upon movement of said piston, means causing continuous air flow into said cylinder and out said ports, said piston member permitting some air to escape in each end of the cylinder, there also being a leak adjacent each end of said cylinder, a gravitationally responsive means so mounted adjacent the discharge point of each leak that the flow of air from the two leaks is oppositely varied upon relative inclination of the gyroscope and gravitational means thereby causing a variation in the pressure in the two ends of the cylinder and consequent displacement of the piston and an unbalanced discharge of air from said ports.

2. An air erector for gyroscopes as claimed in claim 1 in which said gravitational means comprises a pair of pendulums, each lying just beyond each leak and pivoted on axes perpendicular to the jets emerging therefrom.

3. An air erector for gyroscopes as claimed in claim 1 in which said gravitational means comprises a ball or the like mounted in a chamber in the gyroscope for limited rolling on tilt thereof and said leaks are on opposite sides of said chamber to discharge opposed jets against the ball and thereby normally centralize the ball.

4. An air erector for gyroscopes as claimed in claim 1 wherein said cylinder, piston ports and leaks are duplicated to provide erection about both horizontal axes.

5. In an air erector for gyroscopes of the pendulous shutter differential air reaction type, the combination with a universally mounted rotor casing, a cylinder in said casing, a pair of pendulous shutters pivoted on said casing, small ports adjacent thereto and cooperating therewith, said ports being connected to each end of said cylinder, a pair of oppositely directed main ports connected to said cylinder, and a relay piston valve for said main ports within said cylinder for erecting the gyroscope subject to the pressure differential in the two ends of said cylinder, created by unequal closure of said small ports.

6. In an air erector for gyroscopes of the differential air reduction type, a universally mounted rotor casing, a pair of oppositely directed main ports in said casing, the air jets from which are normally balanced, a piston valve for differentially opening and closing said ports, a cylinder enclosing said piston and with which said ports are connected, normally balanced leaks in the two ends of said cylinder, and gravitationally controlled means for differentially varying the flow from said leaks.

7. An air erector for gyroscopes of the type claimed in claim 6, in which said gravitational means comprises a ball mounted to roll in a chamber and ports in the side thereof connected with said leaks.

8. In an air erector for gyroscopes of the differential air reaction type, a pair of oppositely directed main ports the air jets from which are normally balanced, a piston valve for differentially opening and closing said ports, a cylinder enclosing said piston, normally balanced leaks in the two ends of said cylinder, and gravitationally controlled means for closing that leak on the low side of the gyroscope connected with the low end of the cylinder, whereby pressure is applied in the low end of the cylinder, thereby tending to force the piston in a direction opposite to the movement of the gravitational means, thereby reducing errors due to turns.

9. In an erector for gyro verticals, a hollow enclosure on said gyroscope, means whereby air is forced into said enclosure through a plurality of small apertures, a ball or roller in said enclosure for differentially controlling the escape of air from said apertures and normally centralized by the jets issuing therefrom when the gyroscope is vertical, and means controlled by the unbalanced escape of air from said apertures for causing an erecting force to be exerted on the gyroscope.

10. In an erection device for gyroscopes, a rotor casing mounted for oscillation about a horizontal axis, and another axis normal thereto, a gravitationally responsive controller on said casing, a torque applying device comprising oppositely directed air jets for applying torque in either direction on said casing about one of said axes, and a delayed action relay also on said casing operating between said controller and said torque device, comprising a valve differentially opening and closing ports connected with said jets, which valve is slowly responsive to the relative tilt of said gyroscope and said gravitationally responsive device, whereby said gyroscope is substantially unaffected by short period acceleration forces such as due to turns.

11. In a gyro-vertical for aircraft including a rotor bearing housing gimballed in substantially neutral equilibrium, a pneumatically operated relay device on said housing having a normally horizontal cylinder and piston, a source of power controlled by the relative movements of said cylinder and piston for applying an erecting torque on the gyroscope, a source of air pressure, gravitational means controlled by the relative tilt of said housing and said means, and air ports connected with said source of air pressure differentially uncovered by said gravitational means and connected to opposite ends of said cylinder, said connections and ports being so constructed and arranged that said piston responds only to persistent relative tilt of the housing and gravitational means.

12. In a gyro-vertical for aircraft including a rotor bearing housing gimballed in substantially neutral equilibrium, a pneumatically operated relay device on said housing having a normally horizontal cylinder and piston, a source of power controlled by the relative movements of said cylinder and piston for applying an erecting torque on the gyroscope, gravitational means controlled by the relative tilt of said housing and said means, and pneumatic means controlled thereby and connected to said cylinder for moving said piston, said piston being mounted in said cylinder so that the air pressure tends to move it in the opposite direction to the relative movement of the gravitational means and gyro due to acceleration forces.

13. In an erection device, a gyroscope mounted for oscillation about a horizontal axis, and another axis normal thereto, a gravitationally responsive controller on said gyroscope, a torque applying device for applying torque in either direction on said gyroscope about one of said axes, and a relay on said gyroscope located operatively between said controller and torque device and comprising a laterally shifted member, said member moving oppositely to movement of said controller when activated by said controller, whereby a minimum displacement of the center of gravity of the gyroscope takes place.

THEODORE W. KENYON.

CERTIFICATE OF CORRECTION.

Patent No. 2,373,120.   April 10, 1945.

THEODORE W. KENYON.

It is hereby certified that error appears in the printed specification of the above numbered patent requiring correction as follows: Page 3, first column, line 33, claim 6, for "reduction" read --reaction--; and that the said Letters Patent should be read with this correction therein that the same may conform to the record of the case in the Patent Office.

Signed and sealed this 31st day of July, A. D. 1945.

Leslie Frazer (Seal)   Acting Commissioner of Patents.